United States Patent
Bagley (10) Patent No.: US 9,585,521 B2
(45) Date of Patent: Mar. 7, 2017

(54) BREAD KEEPER

(71) Applicant: Progressive International Corporation, Kent, WA (US)

(72) Inventor: Justin Bagley, Seattle, WA (US)

(73) Assignee: Progressive International Corporation, Kent, WA (US)

( * ) Notice: Subject to any disclaimer, the term of this patent is extended or adjusted under 35 U.S.C. 154(b) by 0 days.

(21) Appl. No.: 15/010,787

(22) Filed: Jan. 29, 2016

(65) Prior Publication Data

US 2016/0220072 A1    Aug. 4, 2016

Related U.S. Application Data

(60) Provisional application No. 62/109,881, filed on Jan. 30, 2015.

(51) Int. Cl.
| | |
|---|---|
| *B65D 6/00* | (2006.01) |
| *B65D 8/14* | (2006.01) |
| *A47J 47/12* | (2006.01) |

(52) U.S. Cl.
CPC ..................... *A47J 47/12* (2013.01)

(58) Field of Classification Search
CPC   A47J 47/02; A47J 47/12; A47J 45/063; A47J 47/00; A47J 47/005; B65D 85/36
USPC ............. 220/8, 4.21, 484, 730, 252; 99/448, 99/646 C, 645, 473, 477, 467; 221/65, 45, 221/312 C; 232/45, 19, 20, 38; 206/551, 206/802; 248/345.1
See application file for complete search history.

(56) References Cited

U.S. PATENT DOCUMENTS

| | | | | |
|---|---|---|---|---|
| 4,266,668 A | * | 5/1981 | Paek ........................ | A47J 47/12 206/557 |
| 4,333,603 A | * | 6/1982 | Carlson .............. | A47G 29/1209 232/17 |
| 4,905,869 A | * | 3/1990 | Grigsby .................. | A47J 47/12 221/124 |
| 5,054,685 A | * | 10/1991 | Roach ................ | A47G 29/1209 232/17 |
| 5,735,433 A | * | 4/1998 | Power .................... | A47G 19/32 221/226 |
| 6,601,498 B1 | * | 8/2003 | O'Brion .................. | A47J 47/12 221/197 |
| 8,875,987 B2 | * | 11/2014 | Supulski ............ | A47G 29/1209 232/17 |
| 2006/0163336 A1 | * | 7/2006 | Lackey .............. | A47G 29/1209 232/38 |
| 2015/0021321 A1 | * | 1/2015 | Gosen ................ | B65D 21/0223 220/23.83 |
| 2016/0045076 A1 | * | 2/2016 | de Groote ............... | A47J 47/02 220/212 |

* cited by examiner

*Primary Examiner* — Jacob K Ackun
*Assistant Examiner* — Rafael Ortiz
(74) *Attorney, Agent, or Firm* — Lowe Graham Jones, PLLC (57) ABSTRACT

A bread keeper is formed as storage container for holding bread, and may be configurable between expanded and contracted positions. A door is attached to allow access to the bread within the container. The door folds flat to rest on a horizontal surface such as a countertop, and is constructed from a material suitable for use as a cutting board, thereby allowing the bread to be cut while extending partially out of the container and onto the cutting board.

18 Claims, 8 Drawing Sheets

BREAD KEEPER

PRIORITY CLAIM

This application claims the benefit of U.S. Provisional Application No. 62/109,881, filed Jan. 30, 2015, the contents of which are incorporated by reference.

FIELD OF THE INVENTION

The present invention relates to containers for storing bread.

BACKGROUND OF THE INVENTION

Bread can be challenging to store, particularly in the case of homemade bread because, unlike store-bought bread, it does not come in its own wrapper. Homemade bread can be stored by using plastic wrap or foil, but neither provides a sufficient seal and the bread may get stale quickly. Containers with removable lids are typically not sized appropriately for storing bread. Bags may sometimes be available and sized appropriately for holding the bread, but can be awkward to use when removing the bread for slicing and then returning it for subsequent storage.

SUMMARY OF THE INVENTION

A bread keeper includes a storage container for holding bread. In a preferred version, the storage container is expandable, and in one example it is telescopically expandable.

At one end of the container, a door is hingedly attached to allow access to the bread within the container. The door preferably folds flat to rest on a horizontal surface such as a countertop. The door may be constructed from a material suitable for use as a cutting board, thereby allowing the bread to be cut while extending partially out of the container and onto the cutting board.

An opposite end of the container includes a handle to aid in expanding the container. In one version, the handle further selectively covers or exposes a series of ventilation holes.

In some versions, a floor or bottom panel of the container is corrugated to aid in sliding the bread into and out of the container.

The bread keeper may also include one or more resilient feet, including a resilient foot placed on the door to prevent it from sliding on a horizontal surface when the door is opened.

In some examples, a latch is provided, and in one version the latch may be formed as a magnet and a mating contact surface.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
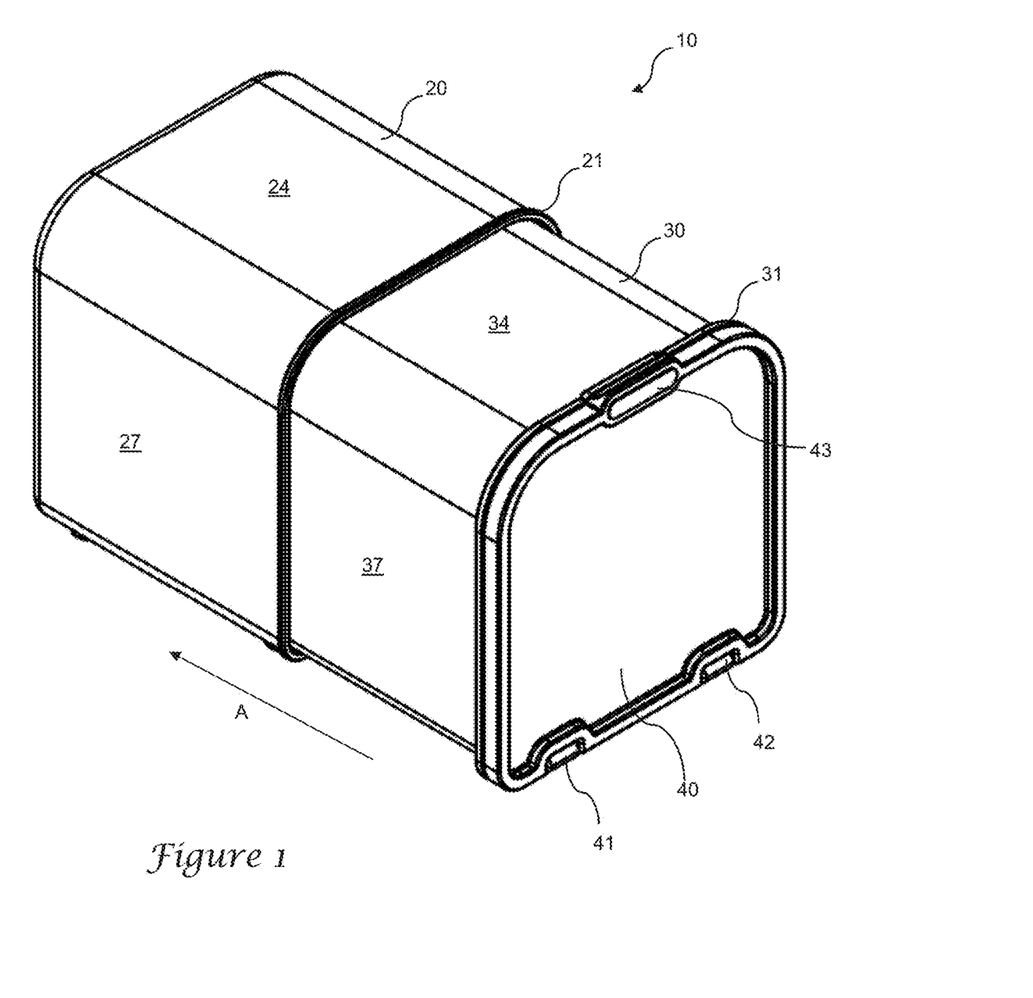
FIG. 1 is a top right perspective view of a preferred bread keeper, shown in an expanded position.
Figure 2:
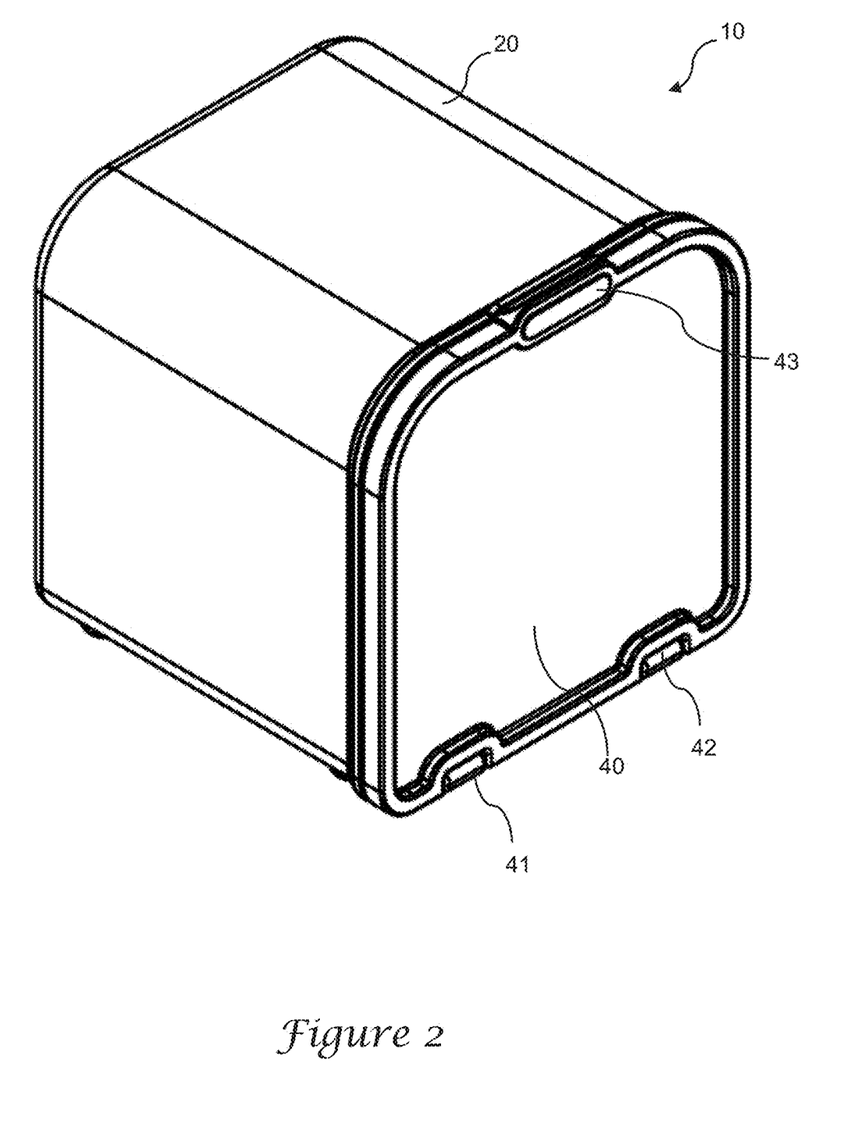
FIG. 2 is a top right perspective view of the bread keeper of FIG. 1, shown in a collapsed position.

As illustrated in FIG. 1, a preferred bread keeper 10 includes a container configured for storing bread or similar items. In one example, the container includes a first portion 20 and a second portion), in which the second portion is extendable from the first portion in order to expand or contract the size of the overall container. A preferred bread keeper 10 is shown in an expanded position in FIG. 1, and in a collapsed position in FIG. 2. In order to transition from the expanded position to the collapsed position, the second portion 30 is telescopically received within the first portion 20 by moving it in the direction of the arrow A illustrated in FIG. 1. In the illustrated example, the second portion fits snugly within the first portion in order to telescopically expand out of the first portion or contract into the first portion.

In one version, the first and second portions 20, 30 are each formed with a generally rectangular cross section (that is, the shape at the opening of each of the sections as defined at the rim 21, 31 of each of the first and second portions), with rounded corners. Thus, the first portion 20 includes a floor or bottom wall 23, a pair of vertical sidewalls 26, 27, a top wall 24, and an end wall 28. The front side of the first portion 20, opposite the end wall 28, is open and is bounded by the rim 21.

The second portion 30 similarly includes a floor 32, a pair of sidewalls 36, 37, and a top wall 34. The second portion, however, does not have an end wall, but rather is open at both the front (bounded by the rim 31, and its attached door 40) and the opposing end. Accordingly, the second portion is essentially a tube with an open front and open back, configured to slide into and out of the first portion.

In a preferred example of the invention, the floor of both of the first portion and the second portion is corrugated, thereby having a series of raised ridges and lowered channels formed in the floor. The corrugated floor improves air circulation and facilitates sliding of bread into and out of the interior space.

In the illustrated example, the second portion 30 fits within the first portion 20 in order to telescopically slide into and out of the first portion to expand and contract the container. In other versions, the second portion may surround the first portion rather than fitting inside it. Likewise, an expandable container may be formed with more than two portions, such as by including a third portion that fits within one or both of the first and second portions in order to expand telescopically.

Figure 7:
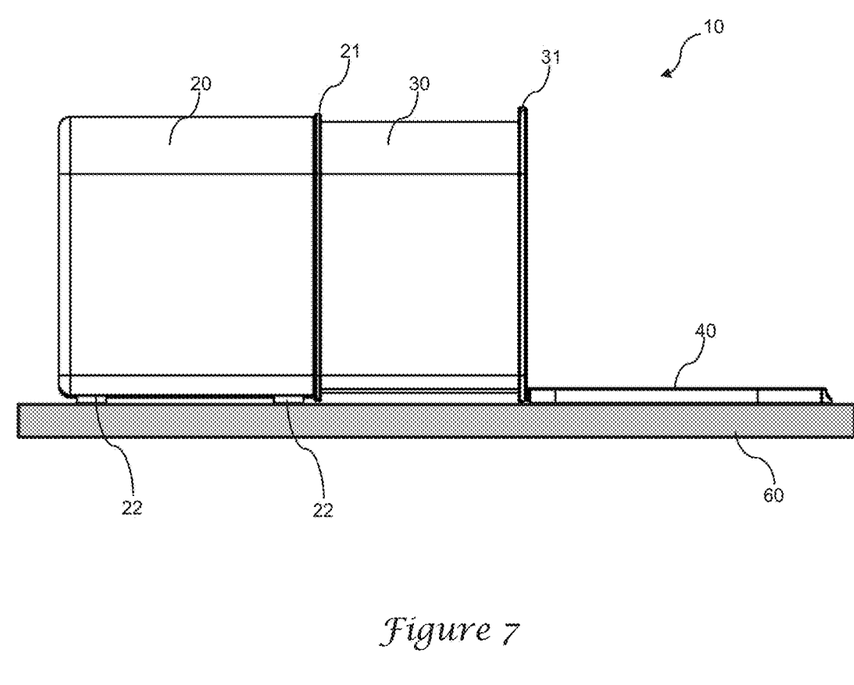
FIG. 7 is a front plan view of a preferred bread keeper.
Figure 8:
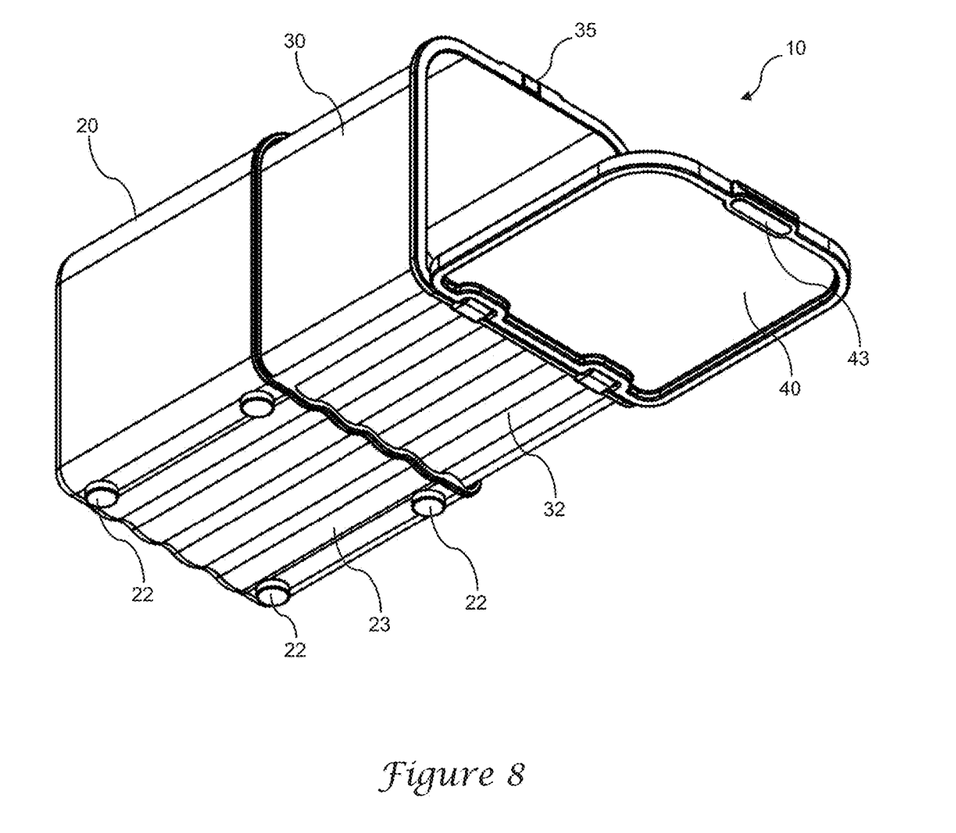
FIG. 8 is a bottom perspective view of a preferred bread keeper.
Figure 9:
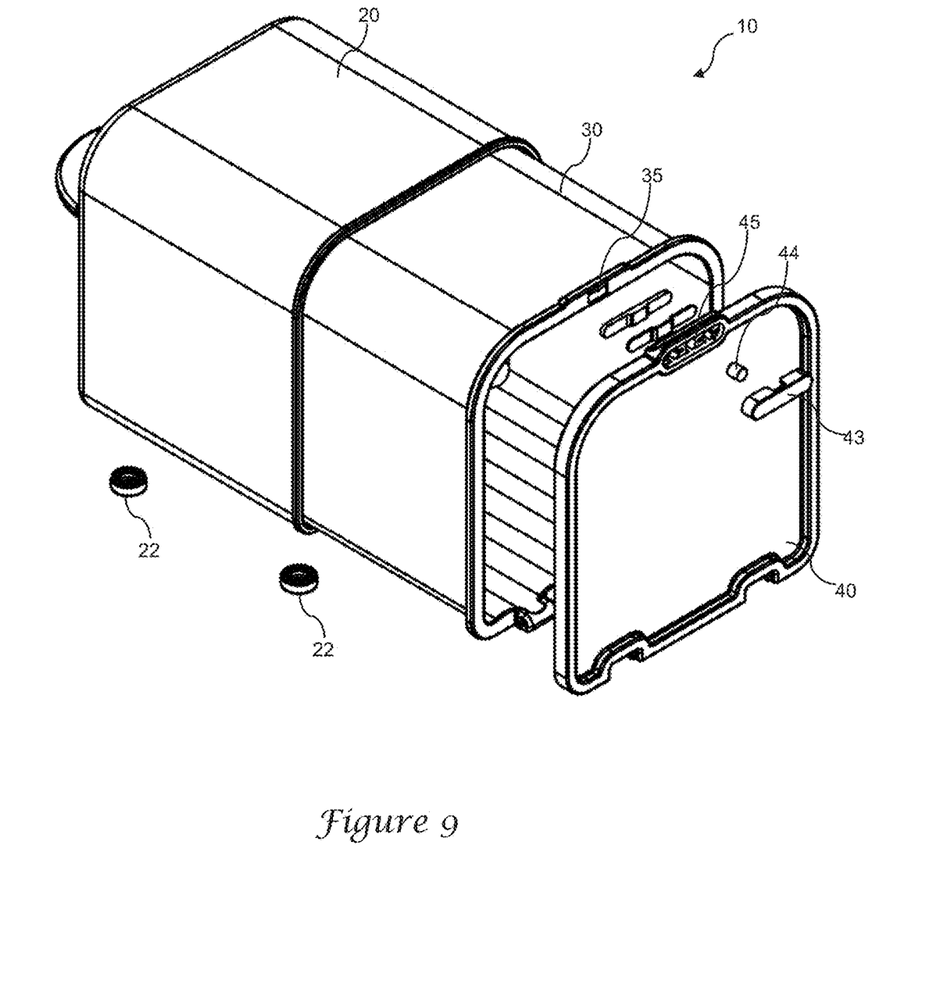
FIG. 9 is a top right partial-exploded perspective view of a preferred bread keeper.

The first portion 20 further includes one or more feet 22 attached to an outer surface of the floor 23 of the first portion, as best seen in FIG. 8. In a preferred version of the invention, the feet are formed from a resilient material such as a thermoplastic elastomer (TPE) in order to increase the frictional adherence between the feet and a horizontal surface 60 such as a countertop on which the container may be placed when in use see FIG. 7).

The second portion 30 further includes a door 40 that is attached to a rim 31 of the second portion at the bottom 32 of the second portion. In the illustrated example, the door is attached via a pair of hinges 41, 42, each of the hinges being located at the rim 31 of the second portion. The hinges are configured, along with the dimensions of the door, such that the door 40 is horizontal when in a fully opened position resting on a horizontal surface 60, as shown in FIG. 7.

In one example as best seen in FIG. 8, the door 40 includes a TPE foot 43 attached to an outer surface of the door, such that the TPE foot 43 of the door will contact the horizontal surface 60 when the door is hinged fully open (that is, in the illustrated example, hinged 90 degrees with respect to its closed position). The TPE foot on the door serves to further impede sliding motion of the container when resting on a horizontal surface.

As shown in FIG. 7, the door hinges open to a point where it is flat on a horizontal surface when in the open position. Most preferably, the door 40 and the floor 32 of the second portion and the floor 23 of the first portion are all parallel when the door is hinged to the open position, to allow bread within the container to slide easily out and onto the door for cutting.

Figure 3:
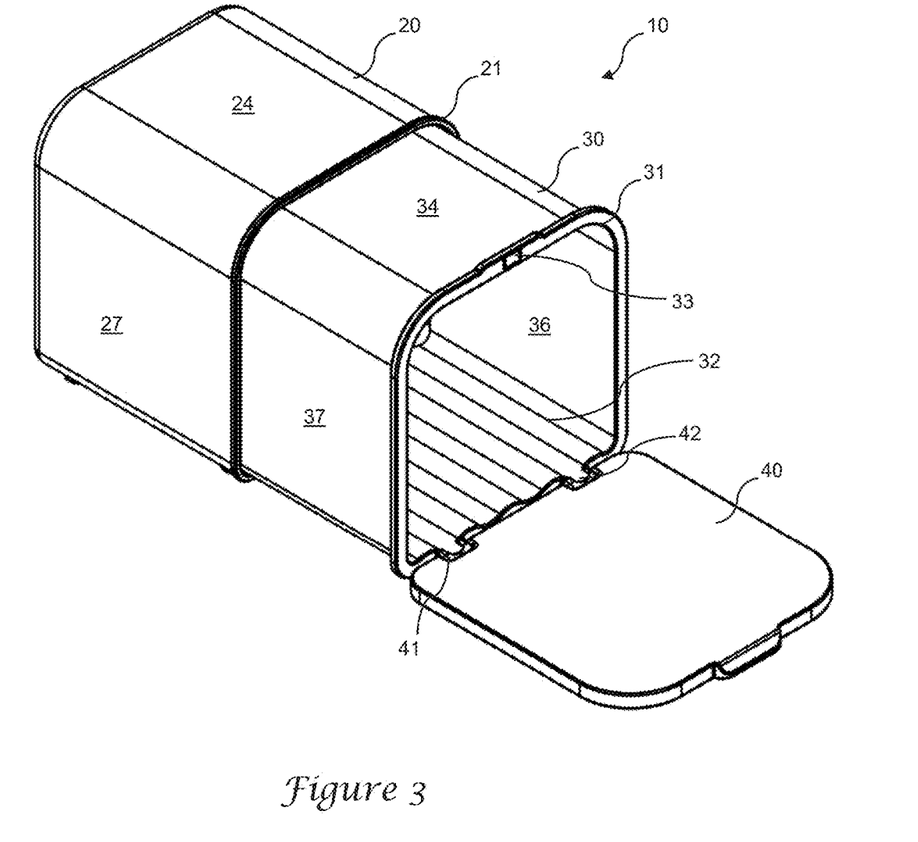
FIG. 3 is a top right perspective view of the bread keeper of FIG. 1, shown with a door in an open position.

In a preferred version of the invention, the door serves as a cutting board. In one example, the door is formed from polypropylene to provide durability so that the door can serve as a cutting board for bread extending partially out of the interior of the container. In other versions, the door may be formed from tow-density polyethylene (LDPE), or from wood such as bamboo. As seen, for example, in FIG. 3, the door 40 is preferably formed with an interior surface (that is, the upper surface when in the open position of FIG. 3) that is entirely planar, to best serve as a cutting board.

In use the door is hinged open to allow access to the bread stored within the container. The bread is pulled out of the container and positioned on the door, which is now horizontally positioned on a horizontal surface. A user may then cut the bread by slicing downward toward the cutting board, which will protect the countertop 60. When a sufficient amount of bread has been cut, the remaining bread is pushed back into the container. The second portion is retracted into the first portion until the size of the container approximates the size of the remaining bread, and the door is hinged closed to seal the bread within the container.

In one version of the invention, the door 40 further includes a magnet 44 positioned within a rim of the door. Most preferably, the magnet is positioned beneath the TPE foot 43 to enclose the magnet within the rim, and therefore it is positioned diametrically opposite the hinge location. The rim of the second portion preferably includes either a mating magnet 35 or an embedded section of iron or other magnetic material in order to provide an attractive force to retain the door 40 in a closed position.

Figure 4:
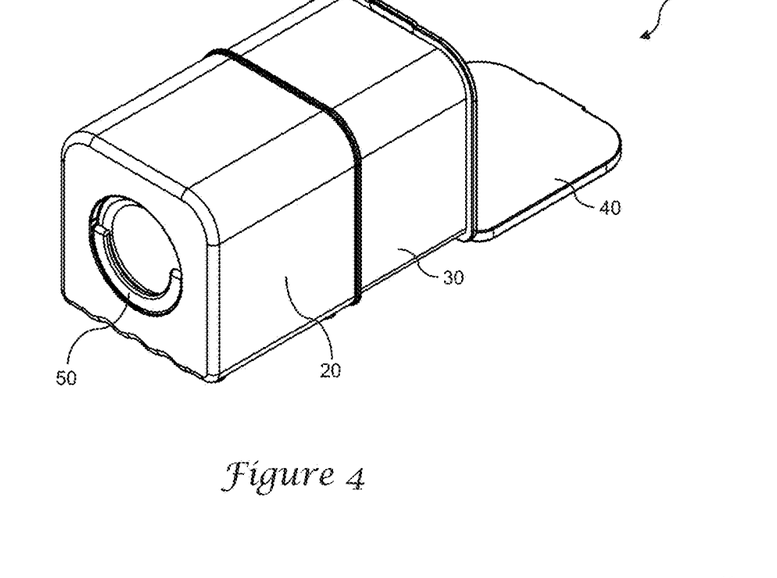
FIG. 4 is a top left perspective view of a preferred bread keeper.
Figure 5:
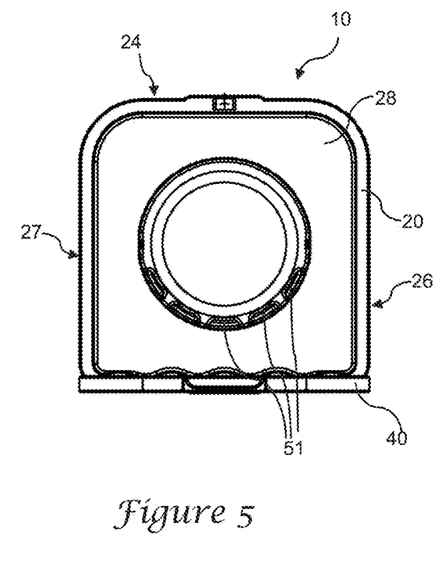
FIG. 5 is a left side plan view of a preferred bread keeper, illustrated with a handle positioned to expose a plurality of ventilation holes.
Figure 6:
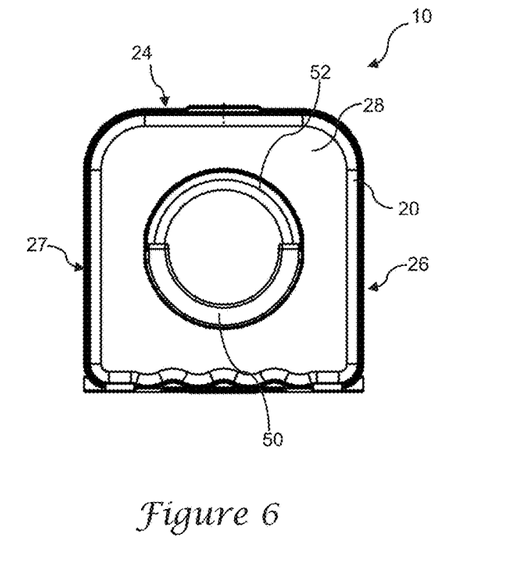
FIG. 6 is a left side plan view of a preferred bread keeper, illustrated with a handle positioned to cover a plurality of ventilation holes.
Figure 10:
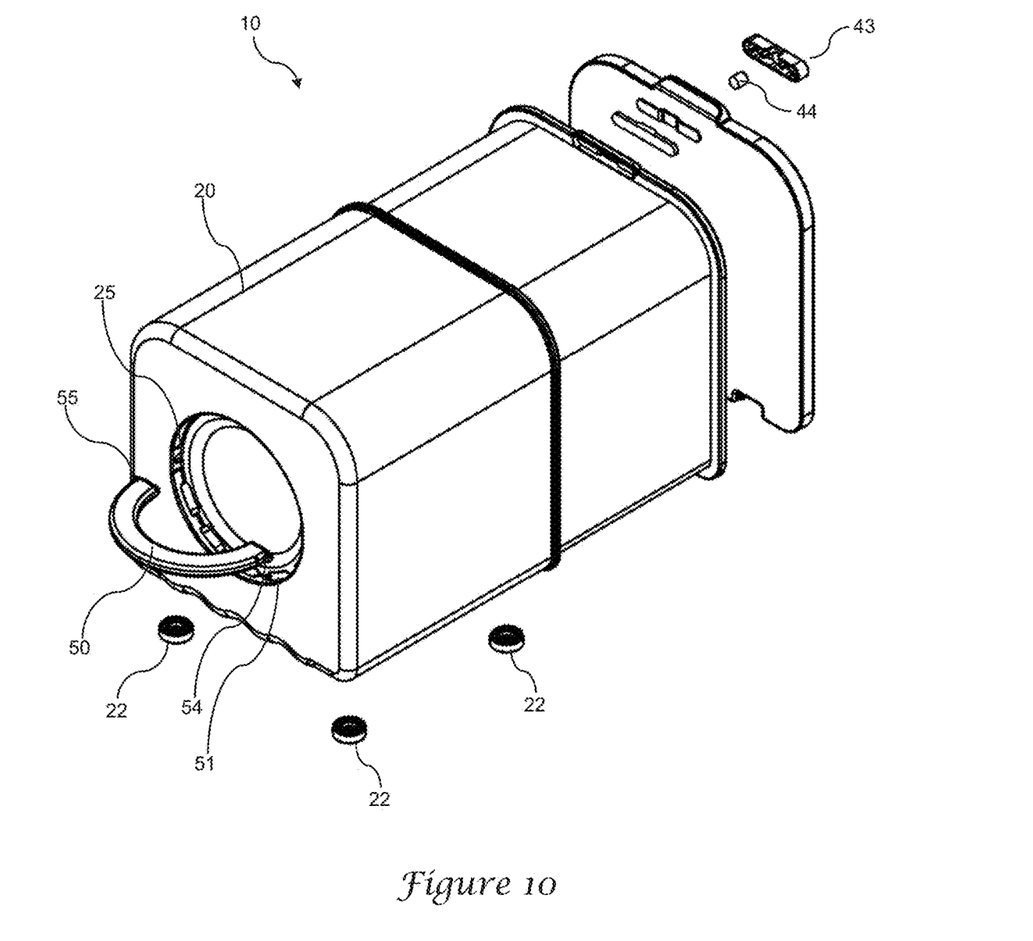
FIG. 10 is a top left partial-exploded view of a preferred bread keeper.

The end wall 8 of the first portion 20 is preferably formed with one or more ventilation holes 51, as illustrated in FIG. 5 and FIG. 10. In the preferred version, a series of ventilation holes are dispersed about a lower half of a circular concavity 25. A handle 50 is formed with a semicircular shape and with a pair of diametrically opposing pegs 54, 55. The pegs fit within holes positioned in a sidewall forming the circular concavity in order to hingedly attach the handle to the end wall 28 at the location of the concavity 25. Most preferably, the ventilation holes are positioned to lie beneath the handle when the handle is rotated into a position flush against the end wall, such that the handle will block the ventilation holes in this position, as illustrated in FIGS. 4 and 6. When the handle is rotated upward from the end wall it exposes the ventilation holes as may be desired. In the rotated upward position the handle also provides a location for a user to grasp the first portion of the container in order to telescopically expand the container by pulling the first portion from the second portion. In a preferred version of the invention, the handle is frictionally fit within the circular concavity with a snug fit such that the handle will stay in a raised position as a result of the frictional force, thereby allowing the ventilation holes to remain exposed if desired.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A bread keeper, comprising:
    a first container portion having a first floor, a first end wall, and a first open rim opposite the first end wall; the first container further having one or more elastomeric feet;
    a second container portion having a second floor, a second open rim, the first container portion and the second container portion combining to define an interior space, the second container portion being moveable with respect to the first container portion between an expanded position defining a relatively larger interior space and a collapsed position defining a relatively smaller interior space; and
    a door hingedly attached to the second container portion and selectively movable between a closed position adjacent the second open rim and an open position rotated away from the second open rim, the door having an elastomeric foot, wherein the door is positioned as a cutting board in the open position, and further wherein when the one or more elastomeric feet of the first container is resting on a horizontal surface and the door is in the open position, the door is supported by the elastomeric foot of the door.

2. The bread keeper of claim 1, wherein the second container portion is telescopically received within the first container portion.

3. The bread keeper of claim 2, wherein the door is formed from low-density polyethylene (LDPE).

4. The bread keeper of claim 2, wherein the door is formed from wood.

5. The bread keeper of claim 2, wherein the door is formed from polypropylene.

6. The bread keeper of claim 5, wherein the second floor is corrugated.

7. The bread keeper of claim 6, further comprising a latch configured to hold the door in the closed position.

8. The bread keeper of claim 7, wherein the latch further comprises a magnet.

9. The bread keeper of claim 1, further comprising a ventilation hole formed in the first container portion.

10. The bread keeper of claim 9, further comprising a handle pivotally attached to the first container portion, the handle being selectively moveable between a first position in which the handle blocks the ventilation hole, and a second position in which the handle exposes the ventilation hole.

11. A bread keeper, comprising:
a first container portion;
a second container portion telescopically attached to the first container portion and selectively moveable between an expanded position and a collapsed position, the first container portion and the second container portion combining to define an interior space;
the second container portion having a corrugated interior floor;
the first container portion terminating in an end wall; and
a cutting board hingedly attached to the second container portion opposite the end wall and being selectively movable between a closed position to enclose the interior space and an open position wherein the cutting board is positioned in a plane parallel to the floor, the cutting board having a first elastomeric foot attached to an outer surface of the cutting board, wherein the cutting board is supported by the first elastomeric foot when the cutting board is in the open position and resting on a horizontal surface.

12. The bread keeper of claim 11, further comprising a latch configured to hold the cutting board in the closed position.

13. The bread keeper of claim 12, wherein the latch further comprises a magnet.

14. The bread keeper of claim 11, further comprising a second elastomeric foot attached to the first container portion.

15. The bread keeper of claim 14, further comprising a ventilation hole formed in the first container portion.

16. The bread keeper of claim 15, further comprising a handle pivotally attached to the first container portion, the handle being selectively moveable between a first position in which the handle blocks the ventilation hole, and a second position in which the handle exposes the ventilation hole.

17. The bread keeper of claim 11, wherein the cutting board comprises an interior surface facing toward the interior space when the cutting board is in the closed position, the interior surface being entirely planar.

18. A bread keeper, comprising:
a container having a first container portion and a second container portion telescopically attached to the first container portion and selectively moveable between an expanded position and a collapsed position, the first container portion and the second container portion combining to define an interior space;
the first container portion terminating in an end wall;
a cutting board having a first elastomeric foot, the container having a second elastomeric foot, the cutting board being pivotally attached to the second container portion opposite the end wall and being selectively movable between a closed position to enclose the interior space and an open position allowing access to the interior space, wherein, when the cutting board is in the open position and resting on a horizontal surface, the container is supported by the second elastomeric foot and the cutting board is supported by the first elastomeric foot.

* * * * *